United States Patent [19]

O'Shaughnessy et al.

[11] Patent Number: 5,138,677
[45] Date of Patent: Aug. 11, 1992

[54] BROADBAND OPTICAL POWER SUMMER

[75] Inventors: John O'Shaughnessy, San Diego; Ronald F. Mathis, Ramona, both of Calif.

[73] Assignee: General Dynamics Corporation, Electronics Division, San Diego, Calif.

[21] Appl. No.: 726,910

[22] Filed: Jul. 8, 1991

[51] Int. Cl.⁵ .......................... G02B 6/26; G02B 6/30; H01J 5/16
[52] U.S. Cl. .......................... 385/43; 385/34; 385/45; 385/49; 385/51; 385/89; 250/227.11; 359/193; 359/195
[58] Field of Search .......................... 385/34, 43, 44, 45, 385/46, 49, 51, 89; 359/107, 108, 131, 193, 195; 250/208.2, 227.11

[56] References Cited

U.S. PATENT DOCUMENTS

| | | | |
|---|---|---|---|
| 3,756,688 | 9/1973 | Hudson et al. | 385/43 |
| 3,874,780 | 4/1975 | Love | 385/46 |
| 3,912,362 | 10/1975 | Hudson | 385/115 |
| 4,522,461 | 6/1985 | Mannschke | 385/34 |
| 4,546,249 | 10/1985 | Whitehouse et al. | 250/227.11 |
| 4,940,306 | 7/1990 | Kitayama et al. | 385/46 |
| 4,950,045 | 8/1990 | Bricheno et al. | 385/49 |
| 4,984,864 | 1/1991 | Blyler, Jr. et al. | 385/46 |
| 5,001,336 | 3/1991 | de la Chapelle | 250/208.2 |
| 5,008,554 | 4/1991 | Asakawa et al. | 250/227.11 |
| 5,016,963 | 5/1991 | Pan | 385/43 |

OTHER PUBLICATIONS

P. J. Severin et al., "Passive Components for Multimode Fiber-Optic Networks," *Journal of Lightwave Tech.*, vol. LT-4, No. 5, May 1986, pp. 490-495.

L. L. Blyler et al., "Polymeric Optical Mixing Rod Coupler," *IEEE Transactions on Components, Hybrids, & Manuf. Tech.*, vol. 13, No. 1, Mar. 1990, pp. 144-146.

M. R. Matthews et al., "Optical Components—The New Challenge in Packaging", IEEE Transactions on Components, Hybrids & Manuf. Tech., Dec. 1990, vol. 13, No. 4, pp. 798-806.

*Primary Examiner*—Brian Healy
*Attorney, Agent, or Firm*—Brown, Martin Haller & McClain

[57] ABSTRACT

An optical power summing apparatus that allows a multiplicity of optical signals to be combined with minimal signal transmission loss. A single photodiode simultaneously receives all of the input signals to perform a summation of signal powers. Alternative embodiments of the apparatus use either a tightly packed bundle of etched optical fibers or a converging arrangement of optical waveguides on a dielectric substrate to focus the optical signals onto the base region of a single photodiode.

16 Claims, 1 Drawing Sheet

BROADBAND OPTICAL POWER SUMMER

BACKGROUND OF THE INVENTION

1. Field of the Invention:

Our invention relates to optical signal processing in general and, more specifically to optical signal combiners for a plurality of optical signals over a broad frequency region.

2. Description of the Related Art:

Many optical signal processing applications require the combination or summing of signals. Positive-Intrinsic-Negative (PIN) photodiodes are frequently used in such applications as optical detectors because of their excellent spectral response and high speed. The PIN diode can be used to sum optical signals because it produces a photocurrent output that is directly proportional to radiant flux at the photosensitive base region when the spot size is vanishingly/respectively small. The ratio of photocurrent to spot flux is called the "responsivity" of the photodiode. Although responsivity is generally independent of base region area because it is defined for a vanishingly small spot size, responsivity varies greatly with distance from the center of the photodiode base region. Response speed of a PIN photodiode also varies with the distance of such a spot from the center. Accordingly, an extremely fast PIN photodiode designed to operate in the gigahertz (GHz) frequency region typically has an base region diameter on the order of 100 microns, with 40 micron diameters being not uncommon.

The PIN photodiode base region diameter is often large enough to couple the device to a single optical fiber, but the joint coupling of more than one such fiber to a PIN photodiode has not been achieved in the prior art. Instead, practitioners have been obliged to combine such signals using prior art devices that passively mix individual beams to form a single combined signal. The combined signal may then be transmitted to a photodiode by a single optical fiber that is coupled to the photodiode using one of a variety of methods known in the art. However, passive beam mixing and combining devices known in the art inherently cause losses of optical signal power that are unacceptable in many situations.

An integrated "combiner" device for passively combining optical signals is commonly used. This is a Y-shaped optical waveguide fabricated on a dielectric substrate that may also be used as a "splitter." Ideally, the angle at which the input branches converge is made infinitesimally small to virtually eliminate loss. Because actual devices cannot be fabricated with an infinitesimally small convergence angle, the actual convergence angle causes a 3 dB loss between inputs and the combined signal output. A tree composed of combiners has been used to combine large numbers of signals, but a tree of even moderate size creates a significant signal-to-noise ratio (SNR) problem because each node contributes a 3 dB loss. For example, combining eight signals requires a three-level tree, resulting in a 9 dB signal loss at the combined output.

Another related integrated device is the "star coupler," which is a passive device having a plurality of optical waveguide inputs that converge to a common "mixing region," thereby combining the input signals, and a plurality of waveguide outputs that fan out from the mixing region. The N×N star coupler is useful for applications where N input signals must be combined and routed to N outputs, as is commonly required in communications networks. However, to evenly distribute the combined signal over all N output waveguides, the width of the mixing region must be significantly larger than that of the individual waveguides. A star coupler cannot be efficiently used as a combiner because each output waveguide receives only one-Nth the combined signal power. Assuming that a star-coupler could be split in half at the mixing region to yield a coupler having a single output, avoiding the factor-of-N power reduction, the mixing region end of the resulting device would still be too large for direct coupling to a PIN photodiode.

Star couplers have been constructed from optical fibers using the "biconical taper" and "fused head-end" techniques, which are described at length by P. J. Severin, et al., "Passive Components for Multimode Fiber-Optic Networks", *Journal of Lightwave Technology*, Vol. 4, No.5, pp. 491–492, May, 1986. The biconical taper technique involves fusing the tapered midsections of two fibers together at high temperatures. Large star couplers must be formed by similarly fusing smaller ones together.

The technique does not work well for large star couplers because signal mixing is often uneven. The fused head-end (FHE) technique described by Severin, et al. involves removing the cladding from the first centimeter at the end of each input fiber, thereby exposing the core, and packing the exposed cores together as tightly as possible in a symmetrical pattern within a capillary tube. Under carefully controlled conditions of temperature and pressure, the capillary tube shrinks and the fibers deform to fill the interstices. The capillary tube then serves as "cladding" over the deformed etched portion of the fibers. The FHE is then drawn to further reduce the diameter of the deformed "core" to approximate that of a single fiber core. However, a 3 dB loss is introduced between inputs and the combined signal output as a result of the drawing process. The resulting FHE is typically coupled to a single fiber to form a splitter or combiner, adding additional signal loss at the discontinuity between the fiber and the FHE.

The FHE technique has generally been limited to multimode fibers because of their larger core diameters. However, an increasing number of commercially available optical devices are using single-mode fibers, which cannot be efficiently coupled to multimode fibers. FHE fabrication using single-mode fibers is very difficult because single-mode fibers are extremely fragile when etched down to their small cores. Single-mode star couplers are known in the art but such star couplers of even moderate size are extremely fragile, requiring complex and expensive packaging techniques such as suspending the coupler joint in a refractive potting compound.

There is a strongly-felt need in the art for an economical, low loss optical power summing device that uses single-mode fibers. These unresolved problems and deficiencies are clearly felt in the art and are solved by our invention in the manner described below.

SUMMARY OF THE INVENTION

Our invention first comprises a plurality of optical fibers, each having most of the cladding layer progressively etched away on a portion at the end of each fiber, forming a stub with a very small diameter. A thin layer of cladding should be left surrounding the fiber's core. The required minimum cladding thickness is determined by the optical wavelengths of interest. These stubs are extremely delicate, having an outside diameter smaller than that of a human hair.

In our invention, these fibers are next gathered into a bundle and rigidly held within a succession of slideably-engaged, hollow, concentric guide tubes of decreasing diameter, resembling a telescoping guide for the fibers. The fiber stub ends are disposed flush with the distal end of the tube having the smallest diameter. The fibers are secured within the succession of guide tubes by means of any suitable material such as epoxy. A potting medium having an index of refraction lower than that of the fiber core is not required because some cladding material is left on each stub.

Multiple slideably-engaged guide tubes are necessary to provide support for the delicate stubs and to force the fiber ends together into a tight stub bundle. Although the fiber stubs cannot be handled without breakage, our invention can be assembled without the need for special assembly jigs, high-temperature fusion devices for joining fibers, or controlled environments. The succession of guide tubes need not be restricted to a lower refractive index than the fiber core material because some cladding material is left on each stub. However, we prefer to use tubes having a protective dielectric coating to prevent deterioration.

A PIN photodiode is disposed adjacent to the stub bundle to optically couple with the stubs and to actively sum the input signal powers. The beam emitted by each stub impinges directly onto the photodiode base region, allowing summation without the signal loss incurred in any intermediate mixing region, such as a length of fiber, disposed between the stub bundle end and the photodiode base region. The inside diameter of the smallest guide tube should be approximately the same as the diameter of the photodiode base region. The stub bundle end surface should be polished for efficient optical coupling to the photodiode base region. This configuration allows the fiber beams to converge on the small photodiode base region, whereby the plurality of optical signals are actively coupled to the photodiode base region. Our summing device is easily fabricated using a minimum number of components.

Alternatively, our summing device may be fabricated on a single dielectric substrate. A plurality of optical input waveguides are disposed to converge in a fan-shaped pattern to a rectangular detector disposed at the substrate edge. Unlike the star coupler and combiner, these waveguides do not completely converge at a single point, thereby avoiding the 3 dB loss associated with the earlier devices. Because these waveguides can be made extremely small, the detector area need not be substantially larger than that for the silica telescoping tube embodiment.

In a similar embodiment, the input waveguides converge at a mixing region that extends to the edge of the substrate. To avoid the power loss incurred in a narrowed mixing region, a lens is disposed at the end of the mixing region for focussing the combined beam onto the small photodiode base region. This lensed waveguide embodiment also allows an extremely small photodiode base region area.

The foregoing, together with other features and advantages of our invention, will become more apparent when referring to the following specifications, claims, and accompanying drawings.

BRIEF DESCRIPTION OF THE DRAWINGS

For a more complete understanding of our invention, we now refer to the following detailed description of the embodiments illustrated in the accompanying drawings, wherein.

DESCRIPTION OF THE PREFERRED EMBODIMENTS

Figure 1:
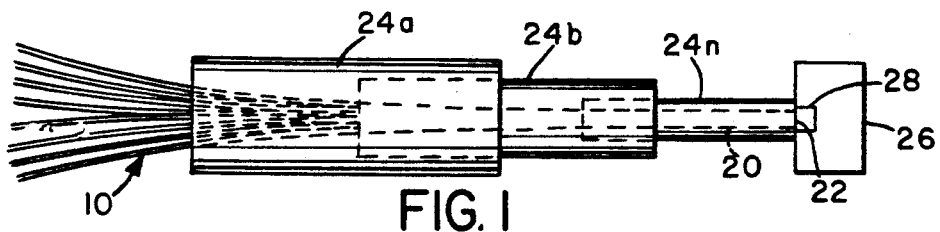
FIG. 1 illustrates the preferred embodiment of our optical coupler invention.
Figure 2:
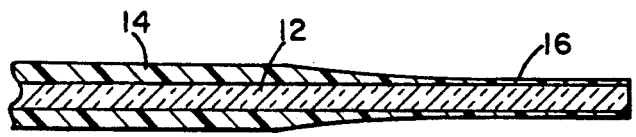
FIG. 2 is a cross-sectional view of an etched fiber stub as used in our coupler shown in FIG. 1.

In FIG. 1 the signal inputs to the device are provided by a plurality of optical fibers 10. Fibers 10, made of silica, typically have an outside diameter of 125 microns, encompassing a core region 12 that is approximately 10 microns in diameter surrounded by a cladding region 14. Hydrofluoric acid (HF) is used to etch away all but a thin layer of cladding region 14 from a small length at the end of each fiber, leaving a delicate stub 16, shown in detail in FIG. 2. The minimum amount of cladding region 14 that must be left surrounding core region 12 depends on the wavelengths of light that are to be guided. The etching must be performed carefully so that fibers 10 do not receive any microscratches. Microscratches left on the etched surface of stub 16 can enlarge over time because of contact with moisture; the hydroxide ions present in the moisture attack the silica. Scratches in the etched surface can cause undesirable signal losses and reduced structural strength.

Fibers 10 are gathered into a bundle with the ends of stubs in flush alignment with each other along a longitudinal fiber axis. The ends of the stubs form a stub bundle 20 with a bundle end face 22, a planar surface normal to the longitudinal fiber axis. The fibers are inserted into a silica ($SiO_2$) tube 24a having an inside diameter that is somewhat larger than the diameter of the bundle. The tube is slipped over fibers 10 and positioned a short distance from the end 22 stub bundle 20, thereby leaving part of stub bundle 20 extending from tube 24a. Fibers 10 are then cast in place, using a suitable potting material or casting resin such as epoxy, inside tube 24a. This casting increases structural strength and protects the portions of fibers 10 in contact with tube 24a from deterioration from scratches and subsequent contact with moisture. Before the potting material hardens, a second silica tube 24b, having an outside diameter smaller than the inside diameter of tube 24a and an inside diameter larger than the diameter of the bundle of fibers 10, is slideably positioned over stub bundle 20 and inserted into tube 24a.

The process may be repeated using a plurality of concentric tubes having successively smaller diameters. Although any number of concentric tubes 24a-24n may be used, we prefer two. After each tube 24a-24n is attached, stub bundle 20 becomes tighter. The next smaller tube can then be attached without handling stub bundle 20. Fibers 10 may be more easily inserted into tubes 24a-24n if they are first wetted with a small amount of the potting material at a point slightly below stub bundle 20 so that the material is drawn up into stub bundle 20 by capillary action. We prefer silica tubes because their thermal expansion is the same as that of fibers 10 but other materials may be suitable, especially if fibers of a composition other than silica are used. Tubes 24a-24n may be coated with a suitable dielectric coating to prevent deterioration from contact with moisture.

Figure 3:
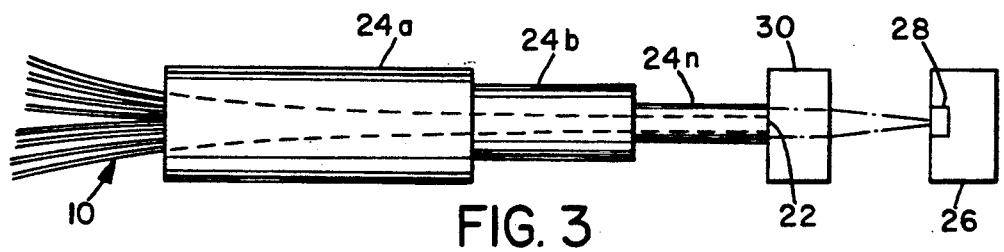
FIG. 3 shows an alternate embodiment of our invention incorporating a GRIN lens.

Bundle end face 22 may be polished to remove excess potting material and fiber imperfections. A PIN photodiode 26 is then optically aligned with end face 22 by positioning the photodiode base region 28 in the path of the beams emitted by bundle end face 22. Tube 24n, the innermost tube, has an inside diameter approximately equal to that of photodiode base region 28. A focussing means such as the GRIN (graded-index) lens 30 shown in FIG. 3 may be disposed between bundle end face 22 and photodiode base region 28 for focussing the beams upon a still smaller area. Although other lenses are suitable, a GRIN lens has properties known to practitioners in the art that allow it to be placed very close to the photodiode. A photodiode having a base region diameter of 50 microns or less may be successfully used in this manner. The entire assembly may be enclosed in a suitable enclosure and "pigtail" connectors may be attached to the fiber ends for connection to other optical devices.

Figure 4:
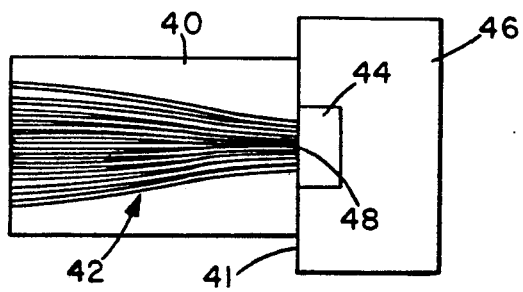
FIG. 4 is a top view of an illustrated embodiment of our invention.
Figure 5:
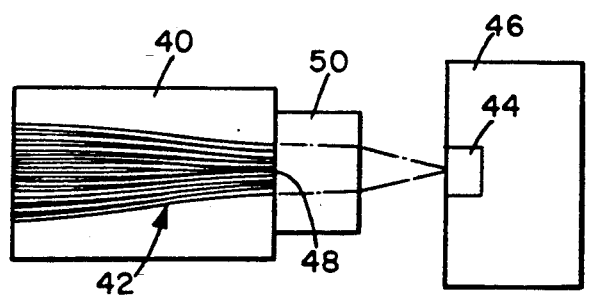
FIG. 5 shows a second illustrated embodiment of our invention incorporating a GRIN lens.

In an alternate embodiment, shown in FIG. 4, the invention is fabricated on a dielectric substrate 40. Such an embodiment is more rugged and also more suitable for large-scale production. A plurality of input waveguides 42 are disposed on substrate 40 in a fan-shaped pattern. Waveguides 40 converge to the base region 44 of a PIN photodiode 46 disposed at one edge of substrate 40. The output end 48 comprises the area of the combined waveguide cross-sections at the edge 41 of substrate 40 where they converge. The illuminated portion of base region 44 of PIN photodiode 46 must be rectangular because waveguide output end 48 has a substantially rectangular cross-section. Although base region 44 of most commercially available PIN photodiodes is circular, the shape of base region 44 does not substantially affect performance so long as the illuminated area remains small. A focussing means such as the GRIN lens 50 shown in FIG. 5 may be disposed between waveguide output end 48 and PIN photodiode base region 44 to reduce spot size.

Figure 6:
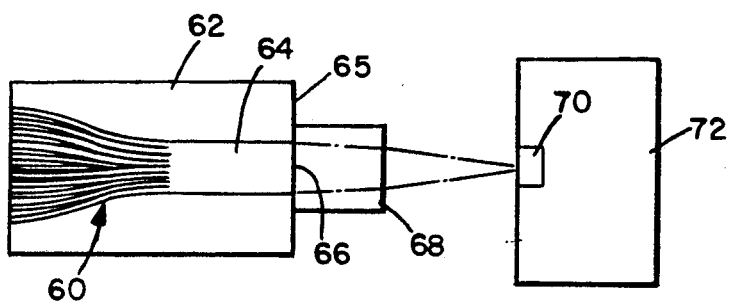
FIG. 6 is a top view of a third illustrated embodiment of our invention.

In a second alternate embodiment shown in FIG. 6, a plurality of input waveguides 60, disposed on a dielectric substrate 62, converge to a mixing region 64. Mixing region 64 extends to the edge 65 of substrate 62. Because the mixing region output end 66 is too large to couple directly to a PIN photodiode, a focussing means such as a GRIN lens 68 is disposed at mixing region output end 66 for focussing the combined signal upon the base region 70 of a PIN photodiode 72.

Obviously, other embodiments and modifications of our invention will occur readily to those of ordinary skill in the art in view of these teachings. Therefore, our invention is limited only by the following claims, which include all such other embodiments and modifications when viewed in conjunction with the above specification and accompanying drawings.

We claim:

1. A summing apparatus for combining a plurality of optical signals, comprising:

a plurality of concentric hollow tubes comprising an innermost tube, said innermost tube having a first end;

a plurality of optical fibers, each having one said optical signal at an input end, each said fiber having an etched stub at an output end disposed in flush alignment with and disposed within said first end of said innermost tube; and a single photodetector means for creating a combination output signal in response to said plurality of optical signals from said stub ends.

2. A summing apparatus as described in claim 1 wherein: said tubes are composed of silica.

3. A summing apparatus as described in claim 2 wherein each said tube comprises: a protective coating.

4. A summing apparatus as described in claim 1 further comprising: focussing means disposed between each said stub end and said photodetector.

5. A summing apparatus as described in claim 6 wherein said focussing means comprises: a GRIN lens.

6. A summing apparatus as described in claim 1 wherein: all said etched stubs are fixed immovably in a potting material.

7. A summing apparatus as described in claim 1 wherein each said stub end comprises: a polished surface disposed orthogonally to the longitudinal fiber axis.

8. A summing apparatus for combining a plurality of optical signals, comprising: a dielectric substrate having a first substrate edge and a second substrate edge, comprising:

a plurality of adjacent optical waveguides for transmitting said plurality of optical signals, each said waveguide having a first end at said first substrate edge for receiving an optical signal and a second end disposed in immediate adjacency with another said second waveguide end, and a mixing region for combining said plurality of optical signals and emitting a combined optical signal, said mixing region having a mixing region input end disposed at said waveguide second ends for receiving said plurality of optical signals; and a single photodetector means, having a base region disposed adjacent to said second substrate edge in the path of said combined optical signal, for creating an output signal in response to said combined optical signal.

9. A summing apparatus as described in claim 8 further comprising: focussing means disposed at said mixing region output end for focussing said combined optical signal upon said base region of said photodetector.

10. A summing apparatus as in claim 9 wherein said focussing means comprises:
    a GRIN lens.

11. A summing apparatus as described in claim 8 wherein: said mixing region comprises a mixing region output end having a substantially rectangular cross-section, said mixing region output end disposed at said second substrate edge.

12. A summing apparatus as described in claim 11 wherein: said photodetector comprises a substantially rectangular active region.

13. A summing apparatus for combining a plurality of optical signals, comprising:

a dielectric substrate having a first substrate edge and a second substrate edge, comprising a plurality of adjacent optical waveguides for transmitting said plurality of optical signals, each said waveguide having a first end disposed at said first substrate edge for receiving an optical signal and a second end disposed in immediate adjacency with another said second waveguide end at said second substrate edge; and a single photodetector means having a base region disposed adjacent to said second substrate edge in the path of said plurality of optical signals, for creating an output signal in response to said plurality of optical signals.

14. A summing apparatus as described in claim 13 further comprising: focussing means disposed at said second substrate edge for focussing said plurality of optical signals upon said base region of said photodetector.

15. A summing apparatus as in claim 14 wherein said focussing means comprises: a GRIN lens.

16. A summing apparatus as described in claim 13 wherein said photodetector comprises: a substantially rectangular base region.

* * * * *